3,156,609
IODOCHLOROETHYL VINYL SULFONE AND ITS USE FOR COMBATTING WHEAT BUNT

Roy B. Flay, Concord, Calif., assignor to California Research Corporation, San Francisco, Calif., a corporation of Delaware
No Drawing. Filed Dec. 23, 1960, Ser. No. 77,851
5 Claims. (Cl. 167—22)

This invention relates to a new chemical compound, namely, idochloroethyl vinyl sulfone, and its unique application for the control of a common wheat-infesting fungus, wheat bunt.

Wheat bunt is a common fungus-caused disease affecting wheat crops. This fungus attacks the wheat seed at the time of planting. As the wheat grows, the fungus grows commensurately, but the presence of the fungus is not usually detectable until shortly before harvest when the seed matures. At that time, it is too late to treat the fungus in order to save the crop. Accordingly, the presence of this fungus causes large losses in wheat harvest, sometimes up to 60 or 70 percent. However, even one percent infection of the wheat can cause the entire crop to be useless for flour manufacture because only this small proportion of infected wheat imparts an obnoxious odor to the entire batch of flour prepared therefrom.

Therefore, in order to entirely eliminate this extremely harmful fungus, it has become common practice in all areas of the world to treat all wheat seed with a fungicide which is effective to completely eliminate this fungus prior to planting. Various commercially available fungicides have been used for this purpose. Iodochloroethyl vinyl sulfone, however, has been found to be comparable to the best of the commercially available fungicides which are conventionally used for the control of wheat bunt.

This new compound is prepared by the reaction of approximately equimolar portions of iodine monochloride and divinyl sulfone. Specifically, divinyl sulfone is dissolved in a suitable solvent, such as carbon tetrachloride. To this solvent mixture, iodine monochloride in a mol ratio of approximately one mol per mol divinyl sulfone is added slowly during agitation. This agitation is continued until the dark orange color of the solution turns to pale yellow. The resultant solution is then cooled and the solids removed therefrom by filtration. If desired, these solids may be recrystallized from ether or other suitable recrystallization solvents.

A specific illustration of the method of preparation of the new compound of this invention is contained in the following example.

EXAMPLE 47.2 g. of divinyl sulfone were dissolved in 400 ml. of carbon tetrachloride. 64.8 g. of iodine monochloride were added to this solution dropwise, while the solution was continuously agitated. The agitation was continued until the dark orange color of the solution had turned to a pale yellow. At this time the mixture was cooled in an ice-acetone bath and the solids which formed were removed by filtration and recrystallized from ether. A solid was obtained melting at 52–57° C. which was analyzed to be iodochloroethyl vinyl sulfone.

*Analysis*

|  | Theory | Found |
|---|---|---|
| Percent Cl | 12.7 | 12.5 |
| Percent I | 45.4 | 44.7 |

By way of illustration of the utility of the compound of this invention as an agricultural fungicide, the following test results are presented. Iodochloroethyl vinyl sulfone was compared with hexachlorobenzene, the standard in the industry for the control of wheat bunt. For these tests, one of three equal portions of wheat seeds which had been previously inoculated with *Tilletia foetida*, the fungus causing wheat bunt, was treated with hexachlorobenzene in concentrations of 0.4 ounce active toxicant per bushel of seed. The second portion was treated with 0.5 ounce iodochloroethyl vinyl sulfone per bushel of seed. The third inoculated portion was not treated and used as a control sample. The percent of the emerging wheat which was infected with wheat bunt in each of these portions was measured. The two treated portions were each compared with the untreated control sample to obtain the percent control. The results of these tests are shown in the following table.

TABLE

| Compound: | Percent control |
|---|---|
| Hexachlorobenzene | 97 |
| Iodochloroethyl vinyl sulfone | 100 |

This table shows that at similar levels of concentration, the degree of control of this common fungus obtained by the standard toxicant, hexachlorobenzene, was approximately the same as that obtained by the new composition of this invention, iodochloroethyl vinyl sulfone.

Aside from the specific formulation and application of the compound of this invention, as represented by the foregoing test, the compound may be dispersed in or upon other inert liquid and solid carriers, such as inert clay, xylenes, etc. The solid carriers may be in the form of a dust or used in conjunction with a suitable wetting agent to form a wettable powder. The fungitoxic compound of this invention may also be formulated with other solvents, dispersing agents, or emulsifying agents. Further, iodochloroethyl vinyl sulfone may not only be applied alone or in mixture with other compounds of the disclosed class but may also be used in combination with other active toxicants in the formulation of fungicidal compositions.

The compound may be applied to any environmental area which is a host to this fungus or susceptible to its attack. Preferably, iodochloroethyl vinyl sulfone is applied to the seeds prior to planting, or directly to the seed-containing portion of the wheat plant. However, the new composition of this invention may be sprayed or otherwise applied directly to a plant or other host, may be applied to the soil either prior to, concurrent with, or immediately subsequent to the planting of seed, or otherwise placed in contact with any part of the plant environment, or used in other similar ways so as to eliminate the wheat bunt fungus and/or effect the control of this extremely harmful wheat disease.

Obviously, many modifications and variations of the invention, as hereinabove set forth, may be made without departing from the spirit and scope thereof, and therefore only such limitations should be imposed as are indicated in the appended claims.

I claim:
1. A method of immunizing wheat plants against wheat bunt which comprises contacting the seeds of said plants with a fungitoxic amount of iodochloroethyl vinyl sulfone prior to planting.
2. A method of treating fungus-infested wheat which comprises contacting said wheat with a fungitoxic amount of iodochloroethyl vinyl sulfone.
3. A method of preventing wheat bunt which comprises contacting wheat with a fungitoxic amount of iodochloroethyl vinyl sulfone.
4. A fungicidal composition comprising a biologically inert carrier and a fungitoxic amount of iodochloroethyl vinyl sulfone.
5. Iodochloroethyl vinyl sulfone.

References Cited in the file of this patent

UNITED STATES PATENTS

| | | |
|---|---|---|
| 2,045,925 | Remy | June 30, 1936 |
| 2,127,400 | Gibbs | Aug. 16, 1938 |
| 2,140,608 | Ufer | Dec. 20, 1938 |
| 2,257,969 | Loane | Oct. 7, 1941 |
| 2,554,576 | Landau | May 29, 1951 |
| 2,628,982 | James | Feb. 17, 1953 |
| 2,802,035 | Fencke | Aug. 6, 1957 |
| 2,870,163 | Davis | Jan. 20, 1959 |

FOREIGN PATENTS

| | | |
|---|---|---|
| 1,209,956 | France | Sept. 29, 1959 |